Dec. 23, 1947.                J. C. EVANS                2,433,208
                          DISTRIBUTOR VALVE
                         Filed Jan. 30, 1946

INVENTOR.
Jeremiah C. Evans
BY
Harness, Dickey & Pierce
ATTORNEYS.

Patented Dec. 23, 1947

2,433,208

UNITED STATES PATENT OFFICE 2,433,208

DISTRIBUTOR VALVE

Jeremiah C. Evans, Detroit, Mich.

Application January 30, 1946, Serial No. 644,211

14 Claims. (Cl. 137—146)

The invention relates broadly to new and useful improvements in fuel distributor valves of the type commonly employed on internal combustion engines for admitting charges of fuel successively to a plurality of cylinders.

In conventional distributor valves, trouble frequently is caused by small particles of dirt which are carried into the valve chamber with the fuel. The dirt works between the rotor and its seat scoring the mating surfaces and eventually causing leakage of fuel therebetween. This condition exists regardless of the type of fuel in the valve, but is most pronounced in the case of gasoline or other fuel having low oiliness properties.

An important object of the present invention is to provide a fuel distributing valve in which the fuel is circulated in such a way that it tends to lave or carry dirt particles away from the valve seat.

Another object of the invention is to provide a fuel distributing valve in which flow of fuel into the valve chamber and centrifugal force due to rotation of the rotor induce circulation of the fuel.

Still another object of the invention is to provide a fuel distributor valve in which the drive shaft for the rotor extends into the housing through the valve seat and substantially concentrically of the fuel outlets so that engagement of the rotor with its seat seals the drive shaft as well as the outlets.

Still another object of the invention is to provide a fuel distributor valve in which fuel in the valve chamber imposes hydrostatic pressure against the rotor, which pressure assists in holding the latter solidly against its seat.

Other objects and advantages of the invention will be apparent during the course of the following description.

In the drawings forming a part of this specification and wherein like numerals are employed to designate like parts throughout the same, Fig. 1 is a longitudinal sectional view through a distributor valve embodying the invention;

Considered in certain of its broader aspects, the invention comprises a housing having a fuel chamber in which is mounted a driven fuel distributing rotor. One wall of the chamber is formed to provide a flat valve seat, and the rotor is pressed solidly against the seat by a suitably mounted spring. Fuel is introduced into the chamber through an inlet located at one side of the valve seat and is discharged therefrom through a plurality of outlets which open onto the valve seat. The outlets are arranged concentrically on the seat, and fuel is supplied thereto through a passage in the rotor which registers successively therewith.

The chamber is relatively large, and hydrostatic pressure of fuel assists the spring in holding the rotor solidly against the seat. This concept is efficacious and, to my knowledge, broadly new.

According to the present invention the rotor is also provided with a radial slot which opens against the valve seat and extends between the fuel supply passage and the periphery of the rotor. This slot sweeps around the marginal portion of the seat during rotation of the rotor; and, as a result, dirt particles which are carried into the fuel chamber and which otherwise might work between the valve and its seat are thrown outwardly through the slot by centrifugal force.

In addition to the above, the arrangement is such that during operation of the valve fuel is constantly circulated into the fuel supply passage and out through the slot. Circulation of the fuel as described above is induced partly by centrifugal action due to rotation of the distributor rotor and partly by flow of fuel into the valve chamber. It will be readily apparent that since the inlet is located at one side of the valve seat, the fuel flows across the slot and assists centrifugal force in causing circulation of the fluid. The continuous circulation of the fuel carries dirt particles out into the chamber and prevents them from lodging between the rotor and its seat. Moreover, as the fuel flows outwardly through the slot, it washes across the marginal surface of the seat and thus tends to dislodge any dirt particles that adhere thereto.

Another feature of the invention resides in the manner in which the rotor is driven. The drive shaft extends centrally through the valve seat and into interlocking engagement with the rotor. As a result of this arrangement engagement of the rotor with its seat not only seals the fuel outlets, but also the drive shaft.

Figure 1:
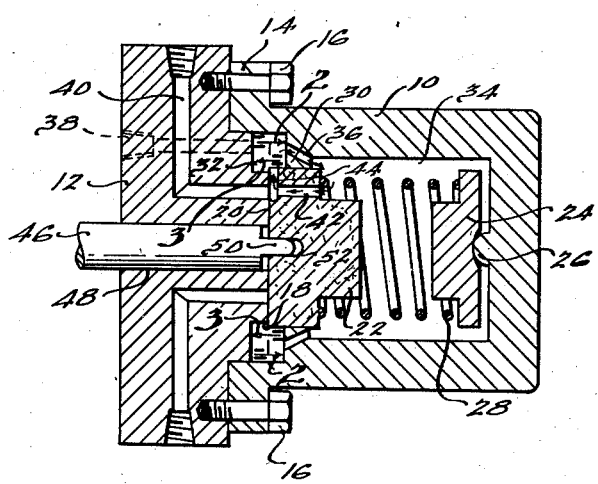
Figure 2:
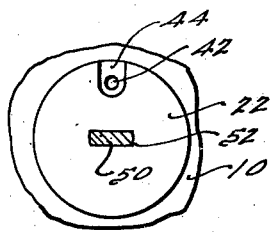
Fig. 2 is a fragmentary, transverse sectional view taken on the line 2—2 of Fig. 1.

For a more detailed description of the invention reference is had to the accompanying drawing wherein, for the purpose of illustration, is shown a preferred embodiment thereof. The valve body comprises an open-ended, cylindrical casing 10 which is closed by a relatively thick base plate 12. Both the casing and the base preferably are formed of cast iron. As shown in Fig. 1, the casing 10 is formed at its open end with an outwardly extending radial flange 14 which flatly engages the base 12. Cap screws 16, which extend through the flange and into internally threaded holes provided in the base, draw the two parts tightly together to provide a fluid-tight joint therebetween. Formed centrally on the inner surface of base 12 is a boss 18. The latter projects into the casing 10 and has a flat top surface 20 which forms a seat for the disk-shaped rotor 22. Disposed behind and spaced from the rotor 22 is a spring mounting 24 which is supported centrally thereof by a pivot 26 on the end of casing 10. Confined between the rotor 22 and the mounting 24 is a compression spring 28 which presses the former solidly against its seat. The rotor 22 is adapted to be driven at relatively high speeds, and the pivot 26 permits mounting 24 and spring 28 to rotate easily in unison with the rotor. Formed integrally on the side wall of casing 10 is an inwardly extending annular flange 30 which snugly fits the periphery of rotor 22 and holds it against lateral movement on the seat 20. Flange 30 also partitions the casing to provide separate chambers 32 and 34. The chamber 32 below the flange is annular in shape and surrounds the boss 18 and the lower peripheral portion of the rotor 22, while the chamber 34 is relatively larger and contains the upper portion of the rotor, the mounting 24, and the spring 28. Intercommunication between the two chambers is provided by an annular series of holes 36 in the flange 30.

Fuel under pressure is introduced into the annular chamber 32 through an inlet passage 38 provided in the base 12 at one side of the rotor 22, and from chamber 32 the fuel passes into the larger chamber 34 through holes 36. As suggested, it is one feature of this invention that hydrostatic pressure of the fuel in chamber 34 against the top surface of rotor 22 assists the spring 28 in holding the latter solidly against the seat 20. As will be readily apparent to those skilled in the art, an effective seal must be maintained at all times between the rotor and its seat if it is to function in the intended manner to control the flow of fuel to the combustion cylinders.

Figure 3:
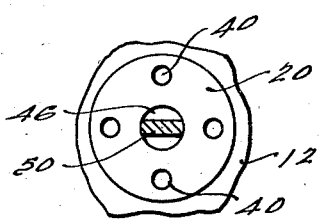
Fig. 3 is a fragmentary, transverse sectional view taken on the line 3—3 of Fig. 1.

Fuel is discharged from the chamber 34 through a plurality of outlet passages 40 in the base 12. One passage is provided for each cylinder supplied by the valve, and, in the drawings, four such passages are shown. At their inner ends the discharge passages 40 open through the seat 20 and against the confronting surface of rotor 22, and at their outer ends the passages open through the edge of base 12. As shown in Fig. 3, the inner ends of the passages 40 are arranged concentrically and in equispaced relation on the seat 20.

The flow of fuel from chamber 34 into the discharge passages 40 is controlled by the rotor 22. Extending longitudinally through the latter and positioned to register successively with the inlet ends of passages 40 during rotation of the rotor is a fuel supply passage 42. This construction is clearly shown in Fig. 1, and it will be observed that the fuel supply passage 42 aligns with the discharge passages 40 so that it, in effect, forms a continuation of the latter and provides direct flow of fuel therein.

As suggested, minute amounts of metal filings, rust, dirt and the like are carried into the valve chamber by the fuel. These foreign particles gradually find their way into the fuel supply passage 42 and frequently work their way between the seat 20 and rotor 22. When this occurs the particles score the mating surfaces and destroy the seal therebetween. Since the above condition is perhaps the most common cause of mechanical failure in distributor valves, any construction which prevents or substantially inhibits its occurrence is a valuable contribution to the art.

According to the present invention any foreign particles which enter the fuel supply passage 42 are thrown outwardly through a radial slot 44 in rotor 22 by centrifugal force which is generated when the latter rotates. As best shown in Fig. 1, the slot 44 opens through the bottom surface of rotor 22 and against the seat 20. At its inner end the slot 44 communicates with the fuel supply passage 42, and at its outer end the passage opens through the periphery of the rotor. Since the rotor 22 is continuously rotated at high speed during operation of the valve, and since the particles, although small, have definite mass and weight, the particles are affected by centrifugal force and thrown outwardly through the radial slot 44. In practice, the slot 44 has been found to be efficacious in preventing dirt particles from gaining access between the rotor and its seat.

The efficacy of centrifugal action in preventing dirt from working into the joint between the rotor and seat is enhanced by constant circulation of fuel through holes 36, fuel supply passage 42, and slot 44 during rotation of rotor 22. This action is indicated by arrows in Fig. 1. It will be observed that the fuel constantly enters fuel supply passage 42 and discharges outwardly through slot 44 whereby to lave or carry away foreign particles which otherwise might lodge on the seat 20. Moreover, since the slot 44 sweeps continuously across the marginal surface of the seat 20 during rotation of the rotor 22, the circulating fuel constantly washes or scrubs the portion of the seat on which dirt particles tend to lodge. Of course, when the fuel supply passage 42 moves into register with one of the discharge passages 40, circulation is momentarily stopped, or at least retarded, due to direct flow of fuel into the outlet, but fuel immediately begins to circulate again as soon as the fuel supply passage moves out of register with the discharge passage. Circulation of the fuel in the above manner is caused partly by centrifugal action due to rotation of rotor 22 which tends to throw the fuel out through slot 44 and partly to the forced flow of the fuel through chamber 32 and across the discharge orifices of the slot 44.

When the fuel being pumped is oil or other fluid having substantial lubricity, the rotor 22 may be formed of a suitable metal such as bronze or steel, and metal rotors preferably are driven as shown in Fig. 1. A drive shaft 46 is mounted for rotation in a bore 48 provided axially in the base 12. The bore 48 opens onto the seat 12 and is disposed substantially concentrically with respect to the discharge passages 40. At its inner end the drive shaft 46 is formed with a longitudinal tongue 50 which projects from the bore 48 and into a correspondingly shaped socket or groove 52 in the bottom surface of rotor 22. Drive shaft 46 preferably is also made of metal, and the tongue 50 and socket 52 provide an interlocking driving connection between the shaft and the rotor.

The manner in which drive shaft 46 is mounted in the valve body and associated with the rotor 22 is another feature of the invention.

Fuel in the valve body is maintained under relatively high pressure, and the problem of maintaining a fluid-tight seal around the shaft which drives the rotor is a very real one. In the instant arrangement engagement of rotor 22 with its seat 20 seals not only the discharge passage 40, but also the drive shaft 46.

Figure 4:
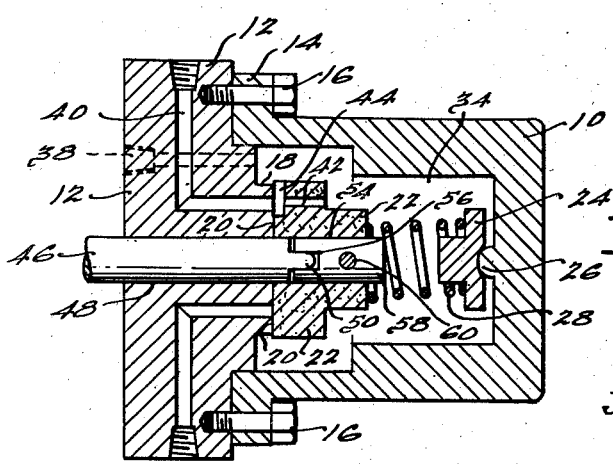
Fig. 4 is a modified form of the invention.

The form of the invention shown in Fig. 4 is identical to the one hereinabove described, except that the supporting flange 30 is eliminated and the rotor 22 is positioned by the drive shaft 46 which extends above the seat 20 and into an alignment bore 54 provided centrally in the rotor. The drive shaft 46 is identical to the one hereinabove described, and the tongue 50 fits into and interlocks with a slot 56 in the end of a stub shaft 58 which is mounted in bore 54. The stub shaft is fixedly attached to the rotor 42 by a transverse pin 60 which has radially projecting terminal portions embedded in the rotor 22.

When the fuel being pumped is gasoline or other fluid having but slight lubricity, the rotor 22 preferably is made of graphite or carbon similar to the brushes conventionally used in electric motors, and the modified form of the invention shown in Fig. 4 is pre-eminently suited for this construction. If the rotor 22 is made of graphite or carbon, then it may be undesirable, in some cases at least, for the drive shaft 46 to be associated therewith in the manner shown in Fig. 1, since the former may be too friable or fragile. However, when shaft 46 is connected to the rotor 22 as shown in Fig. 4, the latter is driven primarily by the projecting portions of pin 60. Since they have greater bearing surface than the tongue-and-groove construction shown in Fig. 1, the stresses are distributed more uniformly through the rotor, and there is less likelihood of the shaft twisting free of the rotor.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, I claim:

1. In a distributor valve, a housing having a chamber provided with a flat valve seat, a fuel inlet opening into said chamber, and a plurality of fuel outlets extending from said chamber and opening onto said seat; and a rotatably driven distributor rotor mounted on the valve seat, said rotor having a radial distributing slot which opens through the side of the rotor and communicates successively at a point radially inwardly from the periphery of the rotor with the fuel outlets during rotation of the rotor.

2. A distributor valve comprising a housing having a chamber provided with a flat valve seat, a fuel inlet opening into said chamber at one side of the valve seat, and a plurality of fuel outlets extending from said chamber and opening onto said seat; a distributor rotor mounted for rotation on the valve seat, said rotor having a radial distributing slot which opens through the side of the rotor and communicates successively at a point radially inwardly from the periphery of the rotor with the fuel outlet during rotation of the rotor; and a drive shaft extending through the bottom of the housing and having a driving connection with said rotor.

3. A distributor valve comprising a housing having a chamber provided with a flat valve seat, a fuel inlet opening into said chamber at one side of the valve seat, and a plurality of fuel outlets extending from said chamber and opening onto said seats; a distributor rotor mounted for rotation on the valve seat, said rotor having a central opening therein opening onto that face thereof in contact with said seat and sealed at its opposite end, said opening being at least in part of non-circular cross section, and a radial distributing slot which opens through the side of the rotor and communicates successively with the fuel outlets inwardly from the periphery of the rotor during rotation of the latter; and a drive shaft extending through the bottom wall of the housing and provided with a driving portion complementary in shape to the noncircular opening in said rotor and received therein for establishing a driving connection with the rotor.

4. A distributor valve comprising a housing having a chamber provided with a flat valve seat, a fuel inlet opening into said chamber at one side of the valve seat, and a plurality of fuel outlets extending from said chamber and opening onto said seat; a distributor rotor mounted for rotation on the valve seat, said rotor having a central opening therein opening onto that face thereof in contact with said seat and sealed at its opposite end, said opening being at least in part of noncircular cross section, and a radial distributing slot which opens through the side of the rotor and communicates successively with the fuel outlets inwardly from the periphery of the rotor during rotation of the latter; a stub shaft mounted axially in the rotor and having radial arms embedded therein; and a drive shaft extending through the bottom of the housing and having a driving portion complementary in shape to the noncircular opening in said rotor and received therein for a driving connection with said stub shaft.

5. A distributor valve comprising a housing having a chamber provided with a flat valve seat, a fuel inlet opening into said chamber at one side of the valve seat, and a plurality of fuel outlets extending from said chamber and opening onto said seat; a distributor rotor mounted for rotation on the valve seat, said rotor having a radial distributing slot which opens through the side of the rotor and communicates successively at a point radially inwardly from the periphery of the rotor with the fuel outlets during rotation of the rotor; a stub shaft mounted centrally in the rotor and having radial arms embedded therein; a drive shaft extending through the bottom of the housing; and interlocking means connecting said drive and stub shafts whereby to establish a driving connection therebetween.

6. A distributor valve comprising a housing having a chamber provided with a flat valve seat, a fuel inlet opening into said chamber at one side of the valve seat, and a plurality of fuel outlets extending from said chamber and opening onto said seat; a rotatably driven distributor rotor mounted on the valve seat and normally sealing the last-mentioned ends of the fuel outlets, said rotor having a radial distributing slot which opens through the side of the rotor and communicates successively at a point radially inwardly from the periphery of the rotor with the fuel outlets during rotation of the rotor; and a fuel supply passage which opens into the last-mentioned end of the distributing slot, whereby centrifugal action due to rotation of the rotor maintains a constant circulation of fuel into said fuel supply passage and out through said distributing slot.

7. A distributor valve comprising a housing having a chamber provided with a flat valve seat, a fuel inlet opening into said chamber at one side of the valve seat, and a plurality of fuel outlets extending from said chamber and opening onto said seat; a rotatably driven distributor rotor mounted on the valve seat and normally sealing the last-mentioned ends of the fuel outlets, said rotor having a radial distributing slot which opens through the side of the rotor and communicates successively at a point radially inwardly from the periphery of the rotor with the fuel outlets during rotation of the rotor, and a fuel supply passage which opens into the last-mentioned end of the distributing slot, the arrangement being such that fuel under pressure in said chamber applies hydrostatic pressure against the rotor to force it solidly against the valve seat and that centrifugal force due to rotation of the rotor causes a constant circulation of fuel into said supply passage and out through said distributing slot whereby to carry away from the valve seat particles introduced into the housing with the fuel.

8. A distributor valve comprising a housing having a chamber provided with a flat valve seat, a fuel inlet opening into said chamber at one side of the valve seat, and a plurality of fuel outlets extending from said chamber and opening onto said seat; a rotatably driven distributor rotor mounted on the valve seat, said rotor having a radial distributing slot which opens through the side of the rotor and communicates successively at a point radially inwardly from the periphery of the rotor with the fuel outlets during rotation of the rotor, and a fuel supply passage which opens into the last-mentioned end of the distributing slot; a rockable member behind said rotor; and a spring means confined between the member and the rotor for holding the latter solidly against said seat.

9. A distributor valve comprising a housing having a flat valve seat, and intercommunicating chambers, one of said chambers being annular in shape and disposed around the valve seat and the other of said chambers disposed above said valve seat, a fuel inlet opening into said annular chamber, and a plurality of fuel outlets opening through and extending from said valve seat; and a rotatably driven distributor rotor mounted on the valve seat and adapted to seal the last-mentioned ends of the fuel outlets, said rotor having a radial distributing slot which opens through the side of the rotor and communicates successively at a point radially inwardly from the periphery of the rotor with the fuel outlets during rotation of the rotor, and a fuel supply passage which opens into the distributing slot at a point radially inwardly of the periphery of the rotor, whereby fuel injected into said annular chamber flows into the other of said chambers across the discharge orifice of said distributing slot and assists centrifugal force due to rotation of the rotor to establish a circulation of fuel into said fuel supply passage and out through the distributing slot, which circulating fuel tends to carry away from the valve seat foreign particles introduced with the fuel.

10. A distributor valve comprising a housing having a flat valve seat, and intercommunicating chambers, one of said chambers being annular in shape and disposed around the valve seat and the other of said chambers disposed above said valve seat, a fuel inlet opening into said annular chamber, and a plurality of fuel outlets opening through and extending from said valve seat; a rotatably driven distributor rotor mounted on the valve seat and adapted to seal the last-mentioned ends of the fuel outlets, said rotor having a radial distributing slot which opens through the side of the rotor and communicates successively at a point radially inwardly from the periphery of the rotor with the fuel outlets during rotation of the rotor, and a fuel supply passage which opens into the distributing slot at a point radially inwardly of the periphery of the rotor, whereby fuel injected into said annular chamber flows into the other of said chambers across the discharge orifice of said distributing slot and assists centrifugal force due to rotation of the rotor to establish a circulation of fuel into said fuel supply passage and out through the distributing slot, which circulating fuel tends to carry away from the valve seat foreign particles introduced with the fuel; and spring means coactive with the rotor to press the same solidly against the valve seat.

11. A distributor valve comprising a housing having a flat valve seat, and intercommunicating chambers, one of said chambers being annular in shape and disposed around the valve seat and the other of said chambers disposed above said valve seat, a fuel inlet opening into said annular chamber, and a plurality of fuel outlets opening through and extending from said valve seat; a rotatably driven distributor rotor of carbonaceous material mounted on the valve seat and adapted to seal the last-mentioned ends of the fuel outlets, said rotor having a radial distributing slot which opens through the side of the rotor and communicates successively at a point radially inwardly from the periphery of the rotor with the fuel outlets during rotation of the rotor, and a fuel supply passage which opens into the distributing slot at a point radially inwardly of the periphery of the rotor, whereby fuel injected into said annular chamber flows into the other of said chambers across the discharge orifice of said distributing slot and assists centrifugal force due to rotation of the rotor to establish a circulation of fuel into said fuel supply passage and out through the distributing slot, which circulating fuel tends to carry away from the valve seat foreign particles introduced with the fuel; and spring means coactive with the rotor to press the same solidly against the valve seat.

12. A distributor valve comprising a housing having a chamber provided with a flat valve seat, a fuel inlet opening into said chamber at one side of the valve seat, and a plurality of fuel outlets extending from the chamber and opening onto said seat; a distributor rotor of carbonaceous material mounted for rotation on the valve seat, said rotor having a radial distributing slot which opens through the periphery of the rotor and against the valve seat and a fuel supply passage which communicates with said slot, the slot and fuel supply passage communicating successively at a point radially inwardly from the periphery of the rotor with the fuel outlets during rotation of the rotor; a stub shaft mounted axially in the rotor and having radial arms embedded therein and a drive shaft extending through the bottom of the housing and having driving connection with said stub shaft.

13. A distributor valve comprising a housing having a chamber provided with a flat valve seat, a fuel inlet opening into said chamber at one side of the valve seat, and a plurality of fuel outlets extending from the chamber and opening onto said seat; a distributor rotor of carbonaceous material mounted for rotation on the valve seat, said rotor having a radial distributing slot which opens through the periphery of the rotor and against the valve seat, said slot adapted to communicate successively at a point radially inwardly from the periphery of the rotor with the fuel outlets during rotation of the rotor; a stub shaft mounted axially in the rotor and having radial arms embedded therein and a drive shaft extending through the bottom of the housing and having driving connection with said stub shaft.

14. In a distributor valve, a housing having a chamber provided with a flat valve seat, a fuel inlet opening into said chamber and a plurality of fuel outlets extending from said chamber and opening onto the seat; and a rotatably driven distributor rotor of carbonaceous material mounted on the valve seat, said rotor having a radial distributing slot which opens through the periphery of the rotor and against said valve seat and a fuel supply passage which communicates with said slot, the slot and said fuel supply passage positioned to communicate successively with the fuel outlets during rotation of the rotor.

JEREMIAH C. EVANS.

REFERENCES CITED

The following references are of record in the file of this patent:

UNITED STATES PATENTS

| Number | Name | Date |
|---|---|---|
| 1,968,390 | Hamilton | July 31, 1921 |
| 1,649,235 | Jones | Nov. 15, 1927 |